United States Patent [19]

Ainsworth

[11] 3,777,655

[45] Dec. 11, 1973

[54] MEAT FLAVORING SYRINGE

[76] Inventor: Sheldon E. Ainsworth, 1704 Shadyside Dr. S.W., Albuquerque, N. Mex.

[22] Filed: Sept. 11, 1972

[21] Appl. No.: 288,090

[52] U.S. Cl. .................................. 99/532, 30/123.3
[51] Int. Cl. ............................................... A23b 1/16
[58] Field of Search ............................ 99/532, 533; 30/123.3, 301, 358; 128/214, 215, 217

[56] References Cited
UNITED STATES PATENTS

| 1,661,595 | 3/1928 | Bowen | 99/532 |
| 2,290,363 | 7/1942 | Stirton | 99/532 X |
| 2,656,600 | 10/1953 | Barbee | 30/123.3 |
| 2,670,673 | 3/1954 | Gordon et al. | 99/532 X |
| 3,082,681 | 3/1963 | Petersen | 99/532 |
| 3,410,457 | 11/1968 | Brown | 99/532 X |
| 3,530,785 | 9/1970 | Peters et al. | 99/532 |
| 3,590,722 | 7/1971 | Leptrone | 99/532 |

Primary Examiner—Robert W. Jenkins
Assistant Examiner—Arthur O. Henderson
Attorney—James E. Snead

[57] ABSTRACT

A syringe for injecting flavor substances in meat constructed of an elongated tubular stem, one or more radial apertures located in the stem proximate a first end, a lance blade of generally open elliptical shape affixed to the stem on the said first end in protective relationship to the one or more apertures and means for detachably attaching the stem at the second end to a compressible flavor substance container.

10 Claims, 5 Drawing Figures

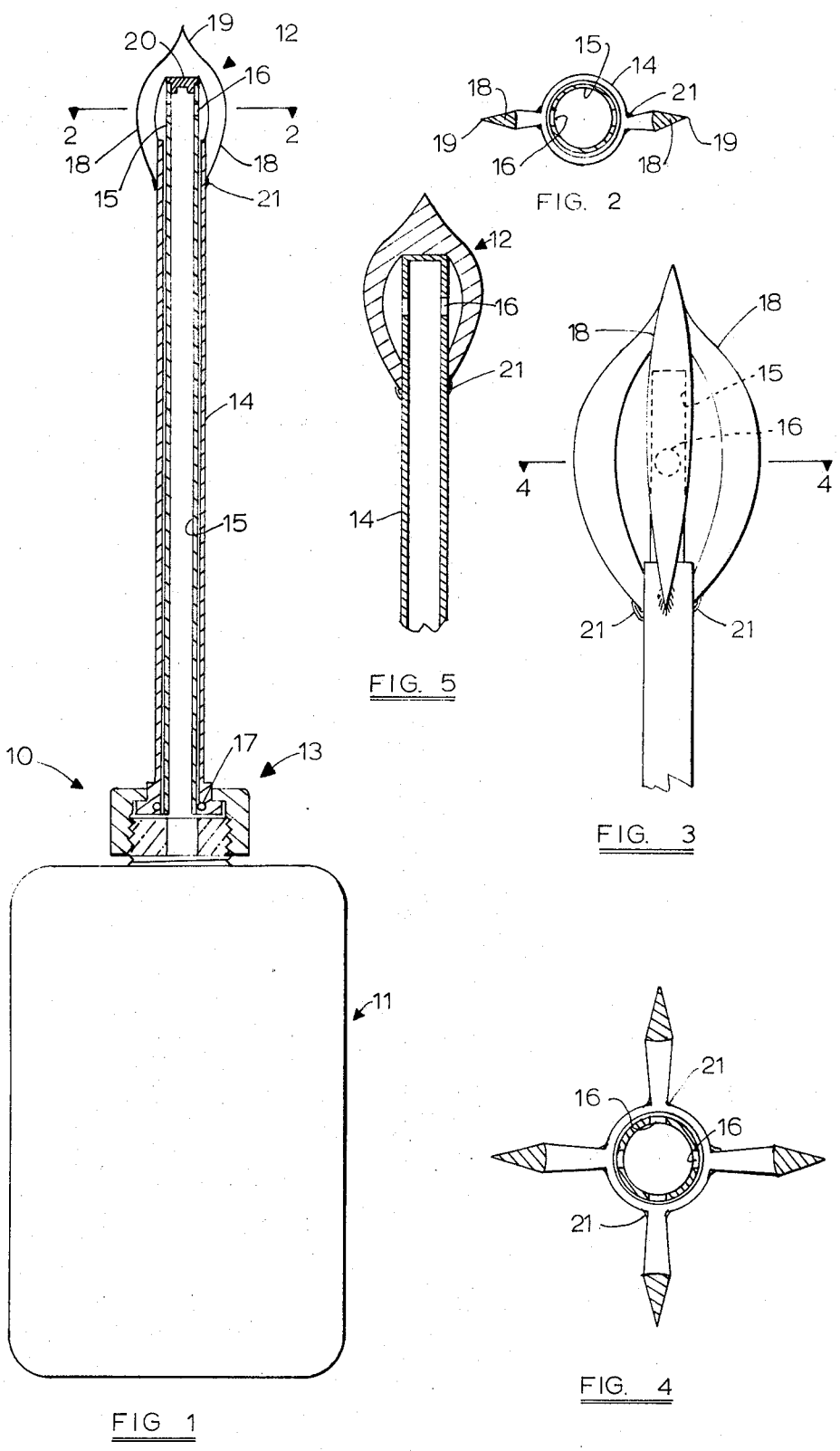

MEAT FLAVORING SYRINGE

BACKGROUND OF THE INVENTION

It is well known in the culinary arts that meat needs to be flavored to enhance palatability. The addition of flavors where slow cooking is feasible is by the slow cooking of the meat in the presence of spices and salts whereby the flavors permeate the meat by absorption or osmosis. Where fast cooking and open fire cooking is employed, the procedure is commonly by basting, that is, by the onerous and wasteful method of brushing the sauces on the surface of the meat. As the meat is cooked the sauces drip off and must be frequently replenished. The method has the additional shortcoming in that the flavor is unable to penetrate more than a surface layer thereby leaving the inner volume of meat unflavored. It would be advantageous if a technique were available to inject, just prior to cooking, flavoring substances throughout the mass of meat in a convenient and effective manner to thereby obtain homogeneous flavoring. Such a device must be capable of injecting flavoring fluids including viscous sauces over a substantial internal volume of the meat. The device must be strong, non-clogging and sanitary.

The inadequacy of the external basting process has been recognized by several prior art inventors. For example U.S. Pat. No. 2,602,391 to Pedranti shows a hollow perforated flavoring spike which is positioned in the center of the meat and which is connected to an external flavoring containing casing to conduct volatile flavors during cooking into the meat. Another prior art device of basic interest is the brine syringe shown in U.S. Pat. No. 1,192,596 to Albrecht. This patent shows a perforated elongated nozzle connected at one end to a pointed head member and at the other end to an elongated pump.

The aforeidentified devices for injecting liquid or volatile substances into meat fail to provide a device which can effectively introduce a controlled amount of flavoring sauces, particularly heavy bodied sauces like barbecue sauce, into a body of meat and which is withdrawn leaving the sauce in the meat to be absorbed promptly during the cooking process.

The present invention provides a meat flavoring device which effectively accomplishes the above discussed requirements. The device provides a lance having a hollow stem or shank apertures of one-eighth inch or more for emitting sauce and a blade at the working end and means for attaching the other end of the stem to a compressible sauce container. The blade is shaped to protect the apertures from clogging by meat fragments and to provide a slitted area along the path of penetration. The lance blade has appreciable thickness such as for example, between one eight of an inch to as much as the diameter of the stem which may be one quarter of an inch or more, so that the meat is spread open in the vicinity of the apertures to allow an effective quantity of sauce to be easily injected and deposited throughout the elongated slit. The quantity of sauce so deposited is controlled by the hydraulic pressure applied to the sauce at the supply end of the elongated tube.

The invention further provides for a pair of crossed ovate lance blades to provide crossed slits in the meat for more effective application of the sauce to the meat volume.

The manner in which the above and other objects and advantages are obtained will become clear from the following description and reference to the figures of the drawing wherein.

FIG. 1 is a vertical plan view, partly in section of a preferred embodiment of the sauce syringe employing the invention.

FIG. 2 is a cross-sectional deatil on plane 2-2 of FIG. 1.

FIG. 3 is a vertical plan view showing an alternate embodiment, and

FIG. 4 is a diametric cross section of the details on plane 4—4 of FIG. 3.

FIG. 5 is a vertical cross-sectional view of an alternative embodiment.

Referring to FIG. 1, the sauce syringe indicated generally by numeral 10 comprises a meat penetrating lance blade 12 supported on the end of an elongated tubular stem 14. The stem 14 is communicatively coupled to sauce reservoir 11.

The blade 12 is an open center lanceolate shaped knife comprising roughly semi-elliptical arches or struts 18 which are affixed to the stem at their lower ends and are joined together at their top. The blade 12, being open centered, symmetrically surrounds sauce emitting apertures 16 and by their presence provides clear passage of the sauce out of the apertures into the meat.

Stem 14 is a strong hollow tupe of non-contaminating substance such as stainless steel or a suitable rigid composition material. The lower end of the stem is suitably configured to be tightly coupled, as by nut 13 to the threaded mouth of the reservoir.

To the end that the syringe may be maintained in completely clean and sanitary condition, I provide a disposable composition material liner tube 15 of a size to provide a free sliding fit in stem 14. The innermost end, i.e., at the top is provided with the sauce emitting apertures 16. The upper end of the liner tube is preferably sealed off either by a detachable cap 20, a molded closure, or by butting against the underside of blade 12. The lower end of liner 15 extends to the bottom of stem 14. Contamination of the interior of stem 14 is prevented by a sealed engagement between the liner and the stem by gasket 17 or by molding the lower end of liner 15 to a squeeze fit with the stem.

FIG. 2 is a cross-sectional detail on plane 2—2 of FIG. 1 and shows the sharp configuration of blade struts 18. The lower ends of the blade struts are affixed to the upper end portion of the stem 14 by brazed joints 21 or an integral cast joint or the like. Apertures 16 of liner 15 and blade struts 18 lie in a common plane which passes through the axis of the stem.

FIGS. 3 and 4 show an alternative embodiment in which a pair of crossed blades 18 are provided to enhance dispositing the flavoring sauce into a larger volume of meat than is obtainable with the single blade embodiment of FIGS. 1 and 2. Two pairs of apertures 16 are provided in liner 15. The remaining details of structure of this embodiment are the same of those of FIG. 1.

The liner 15 of the foregoing embodiments is a desirable feature in the interest of sanitation. After use, the liner 15 is simply slipped out of stem 14 and is discarded, or, if desired, the liner may be provided with a removable cap 20 so that it can be cleaned by passing a cleaning device through it. Such a cap is shown at the upper end of the liner in FIG. 1.

If the nuisance of cleaning the stem itself is disregarded the device can be simplified by not providing a liner tube, but by extending the stem itself upward into the space between the blade struts as shown in FIG. 5. A removable cap such as cap 20 of FIG. 1 may be provided to enhance cleaning, but in such a case, the blade assembly would be detachably secured to the stem as by threaded engagement.

In operation, the reservoir 11 is provided with the selected sauce and is then coupled by means of threaded stem coupler 13 to stem 14 and tube liner 15. The lance is inserted into the meat to provide the slit or slits therein to the desired depth and as it is withdrawn, pressure is applied to reservoir 11 so that as the width of the blades expand the slit or slits in the meat, the sauce even through viscous, is easily propelled from apertures 16 into the space within the blade struts which uniformly disperse the sauce throughout the slit surfaces. The amount of sauce injected is controlled by the pressure applied to reservoir 11 and/or by a twisting torque applied to the lance during withdrawal.

What is claimed is:

1. A meat flavoring syringe comprising a flavoring sauce reservoir, and a hollow lance stem, at least one generally elliptical shaped open center lance blade affixed to a first end of the lance stem, means for coupling the other end of the lance stem to the reservoir in communicating relationship with the interior thereof, said lance stem first end communicating with the space within the elliptical shaped open center lance blade.

2. The meat flavoring syringe of claim 1 in which the lance blade exterior configuration is lanceolate.

3. The syringe of claim 1 in which the lance stem extends into the interior space of the open center lance blade and is provided with at least one aperture lying in a common plane with the blade and the axis of the stem.

4. The flavoring syringe of claim 3 in which a pair of open center lance blades are affixed to the stem and are supported in crossed cruciform relationship.

5. The flavoring syringe of claim 4 in which the lance stem is provided with four apertures lying in quadrature, opposed pairs being alligned with the plane of each of said lance blades.

6. The flavoring syringe of claim 4 in which the configuration of each of said pair of cross blades in the direction of the major axis of the respective ellipse is pointed airfoil shape.

7. The flavoring syringe of claim 4 in which the liner tube has an outer diameter to give a zero clearance free slide fit with the interior of the stem, a detachable cap plug closing the lance blade end of the liner tube and means at the other end of the liner tube to effect a leak proof seal between the liner tube and the interior of the stem.

8. The flavoring syringe of claim 1 in which a liner tube is supported within the lance stem, means for providing a leak proof seal between the lance stem and the liner at the reservoir end thereof, means for closing the lance blade end of the liner tube and a pair of radial apertures lying on a single diameter which lies in the plane of the blade and the lance stem axis.

9. The following syringe of claim 1 in which the configuration of the blade in the direction of the major axis of the ellipse is pointed airfoil shape.

10. The flavoring syringe of claim 1 in which the lance blade comprises two opposed blade struts, said struts being sector shaped in the plane normal to the axis with the apices of the struts pointing outward to provide cutting edges and the arcuate portion provides a spreading function to facilitate application of the sauce to the slitted meat throughout such slits.

* * * * *